United States Patent Office 3,557,071
Patented Jan. 19, 1971

3,557,071
FOAM PREVENTION FOLLOWING EMULSION POLYMERIZATION
Paul J. Steinwand, Placentia, Calif., assignor to Union Oil Company of California, Los Angeles, Calif., a corporation of California
No Drawing. Filed Nov. 30, 1967, Ser. No. 686,837
Int. Cl. C08f 15/00
U.S. Cl. 260—87.3
6 Claims

ABSTRACT OF THE DISCLOSURE

Foam prevention following copolymerization of vinyl acetate with ethylene under pressure is achieved by providing a layer of water on top of the emulsion. Preferably the water is added by spraying and may contain a small amount of foam inhibitor.

This invention relates to a new and improved process for the reduction of foaming following the emulsion copolymerization of a vinyl compound with a gaseous monomer under pressure, and more specifically to the copolymerization of vinyl esters such as vinyl acetate with ethylene. This invention is specially concerned with a process for preventing foam formation in the reaction mixture when reducing the reaction pressure from a high value to atmospheric pressure.

In the emulsion polymerization of vinyl esters with a gaseous monomer at high pressure such as 10–150 atmospheres, a residual amount of the gaseous monomer will always be present upon completion of the reaction; this applies particularly to the emulsion copolymerization of vinyl acetate with ethylene. When the copolymerization reaction has terminated, the pressure is reduced from say, 500 p.s.i. down to atmospheric. At this time the residual ethylene comes out of solution and causes foaming to occur. This foaming is enhanced by the emulsifiers and other surfactants used to stabilize the emulsion. The foaming represents both a serious handling problem and also a problem in the delay of production while the foam dissipates.

Defoaming agents are usually added to the emulsion to suppress foam formation, but their use involves many drawbacks. For one thing, they are expensive; also they generally reduce the stability of the emulsion; and finally they interfere with the film formation by the emulsion in a latex paint. For these reasons, the anti-foam agents are used in very low concentrations or are avoided entirely.

Accordingly, an object of this invention is to provide a process for inhibiting foam formation following the high pressure emulsion copolymerization of a vinyl ester with a gaseous monomer.

Another object is to prevent foam formation following the high pressure copolymerization of vinyl acetate with ethylene.

Another object is to prevent foam formation following the high pressure copolymerization of a vinyl ester with a gaseous monomer while employing a minimum of defoaming agent, if at all.

Other objects of the invention will become apparent from the description to follow.

According to the invention, following completion of the polymerization, a layer of water is applied to the emulsion surface before, or during depressurization. If the water is applied to the emulsion surface prior to depressurization, bubbles of unreacted monomer will rise to the surface but little foam will form. The reason foaming will not take place is because there is little surfactant at the liquid-gas interface. Also the unreacted ethylene monomer bubbles will pass through the water without producing foam because the viscosity of the water is very low.

Preferably the water is added after the polymerization has been completed but before the reactor is depressurized; the water temperature is preferably the same as that of the emulsion. Since the emulsion is somewhat (15%) denser than the water, and is also more viscous, the water layer tends to remain at the emulsion surface.

The water may be introduced from the top of the reactor as a fine spray; alternately the water can be introduced slightly above the emulsion level and allowed to run down the side of the reactor.

During depressurization, additional water may be added and if desired, an anti-foam agent may be added in small amounts to the water spray. Since the anti-foam agent will be added directly to the area of foaming rather than being admixed with the emulsion as a whole, it will be far more effective (by about a factor of 10), hence less ($\frac{1}{10}$) anti-foam agent is necessary to produce equivalent results. As previously mentioned, the water may be applied to the emulsion surface prior to depressuring the reactor. However, the spray of water also may be employed to break a foam during depressurization even though a layer of water has not yet been placed on the emulsion surface prior to depressurizing.

While depressurizing is taking place, a mild stirring of the emulsion will help break the foam. Stirring action may be obtained with jets of water in the spray or by employing conventional mechanical stirrers. After completion of depressurization, that is, when the reactor pressure is at atmospheric, the contents of the reaction are stirred thoroughly to give a uniform emulsion.

Since most commercial specifications require 55% solids in the emulsion, where the solids content following polymerization is about 60%, dilution of the 60% emulsion with water to prevent foaming serves the added purpose of reducing the solids content down to the commercially accepted figure.

It will be appreciated that other vinyl monomers besides vinyl acetate are included by this process. These would include vinyl chloride, acrylates, etc. Also terpolymers and higher, with vinyl acetate and ethylene are amenable to the foam reduction process of this invention.

Other gaseous monomers such as vinyl fluoride, propylene, etc. are included in the present nivention.

I claim:
1. In an emulsion polymerization process wherein a vinyl compound is copolymerized with a gaseous monomer under superatmospheric pressures to form a polymer emulsion having a density greater than the density of water, the pressure is reduced after polymerization, and unreacted monomer forms bubbles which ascend out of said emulsion, the improvement comprising floating a layer of water on the surface of said emulsion, whereby said monomer bubbles ascend from the emulsion through said water layer, and foaming is inhibited.
2. The process of claim 1 wherein said water layer is formed on said emulsion after polymerization is completed but before said pressure is reduced.
3. The process of claim 1 wherein said water layer is maintained on said emulsion by spraying water thereon.
4. The process of claim 1 wherein the emulsion is contained in a reactor and said water layer is maintained on said emulsion by introducing water above the emulsion at the walls of said reactor and permitting the water to run down said walls to said water layer.

5. In an emulsion polymerization process wherein vinyl acetate and ethylene are copolymerized under superatmospheric pressures to form a polymer emulsion having a density greater than the density of water, the pressure is reduced after polymerization, and unreacted ethylene forms bubbles which ascend out of said emulsion, the improvement comprising floating a layer of water on the surface of said emulsion, whereby said ethylene bubbles ascend from the emulsion through said water layer and foaming is inhibited.

6. The process of claim 5 wherein said water layer contains another anti-foam agent.

References Cited

UNITED STATES PATENTS

| | | | |
|---|---|---|---|
| 1,237,961 | 8/1917 | Schwarz | 252—321 |
| 2,773,041 | 12/1956 | Larsen et al. | 260—29.6EM |
| 3,037,000 | 5/1962 | Bannerman | 252—321 |

LEON D. ROSDOL, Primary Examiner

W. E. SCHULZ, Assistant Examiner

U.S. Cl. X.R.

252—321, 358